United States Patent [19]
Gray

[11] Patent Number: 6,031,584
[45] Date of Patent: Feb. 29, 2000

[54] METHOD FOR REDUCING DIGITAL VIDEO FRAME FREQUENCY WHILE MAINTAINING TEMPORAL SMOOTHNESS

[75] Inventor: Patricia Lee Gray, Gilbert, Ariz.

[73] Assignee: Intel Corporation, Santa Clara, Calif.

[21] Appl. No.: 08/938,776

[22] Filed: Sep. 26, 1997

[51] Int. Cl.$^7$ ............................................ H04N 7/24
[52] U.S. Cl. .................. 348/845.2; 348/423; 348/439
[58] Field of Search .............................. 348/845.2, 423, 348/439; H04N 7/24

[56] References Cited

U.S. PATENT DOCUMENTS

| | | | |
|---|---|---|---|
| 5,319,453 | 6/1994 | Copriviza | 348/473 |
| 5,467,342 | 11/1995 | Logston | 370/253 |
| 5,535,008 | 7/1996 | Yamagishi | 386/109 |
| 5,640,388 | 6/1997 | Woodhead | 348/464 |
| 5,646,675 | 7/1997 | Copriviza | 348/1 |

*Primary Examiner*—Howard Britton
*Attorney, Agent, or Firm*—Blakely, Sokoloff, Taylor & Zafman LLP

[57] ABSTRACT

A method for reducing digital video frame frequency while maintaining temporal smoothness during processing of video frames for display is disclosed. The method predicts the number of video frames to be dropped prior to decoding of a video frame in response to a delay in the processing of video frames, adjusts the timestamp for each video frame surrounding the video frames to be dropped in response to the predicting and displays the video frames surrounding the video frames to be dropped according to the adjusted timestamp.

24 Claims, 8 Drawing Sheets

ORIGINAL: 410, 415 TIMESTAMP {

| | FRAME 1 | FRAME 2 | FRAME 3 | FRAME 4 | FRAME 5 | FRAME 6 | FRAME 7 | FRAME 8 | FRAME 9 |
|---|---|---|---|---|---|---|---|---|---|
| DISPLAY TIME | x | x+1/30 | x+2/30 | x+3/30 | x+4/30 | x+5/30 | x+6/30 | x+7/30 | x+8/30 |
| DURATION | 1/30 | 1/30 | 1/30 | 1/30 | 1/30 | 1/30 | 1/30 | 1/30 | 1/30 |

420

DROPPED FRAME: 410, 415 TIMESTAMP {

| | FRAME 1 | FRAME 2 | FRAME 3 | FRAME 4 | FRAME 5 | FRAME 6 | FRAME 7 | FRAME 8 | FRAME 9 |
|---|---|---|---|---|---|---|---|---|---|
| DISPLAY TIME | x | x+1/30 | x+2/30 | x+3/30+1/180 | x+4/30+2/180 | DROPPED | x+5/30+3/180 | x+6/30+4/180 | x+7/30+5/180 |
| DURATION | 1/30 | 1/30 | 1/30+1/180 | 1/30+1/180 | 1/30+1/180 | | 1/30+1/180 | 1/30+1/180 | 1/30+1/180 |

420

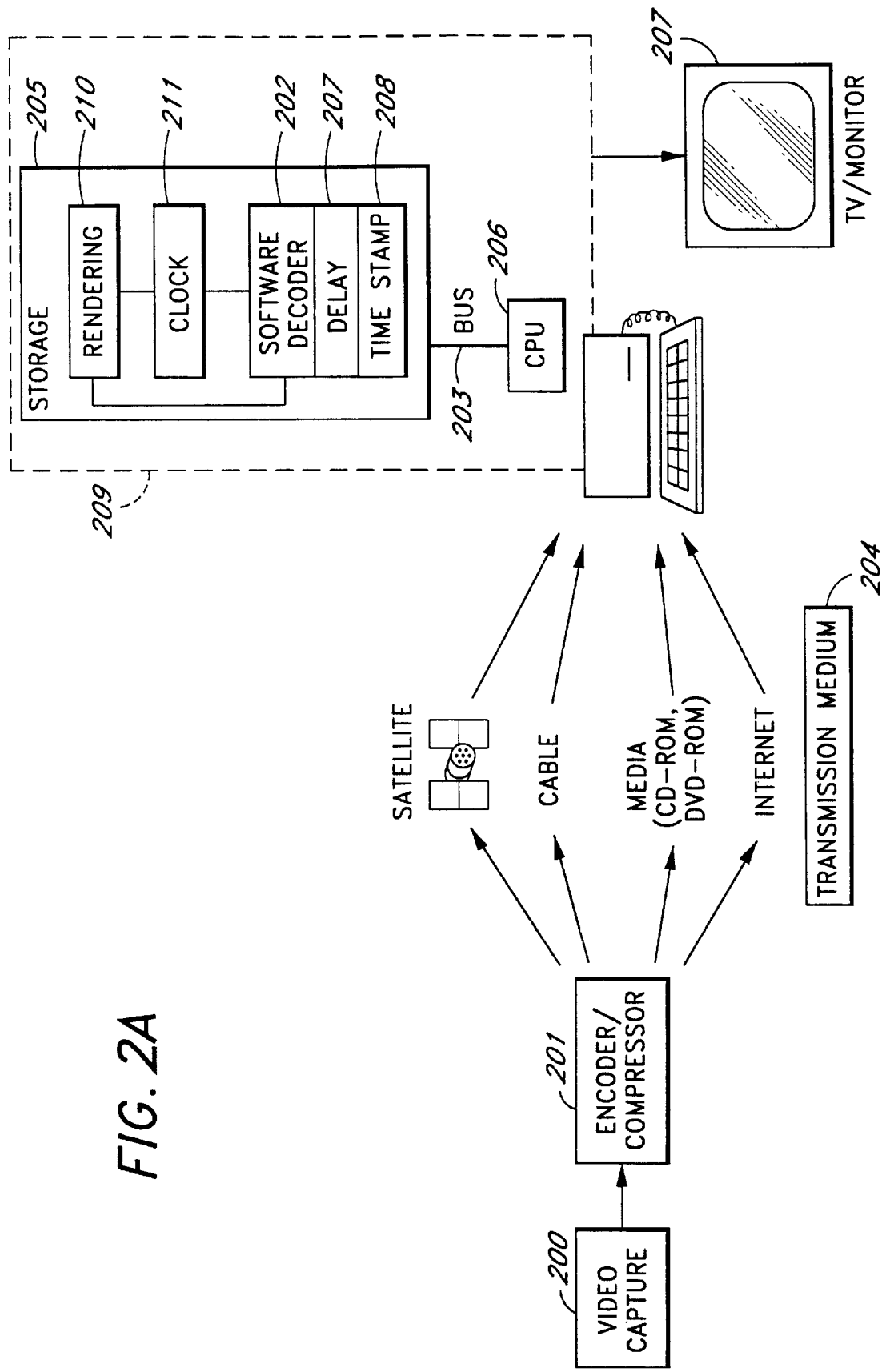

FIG. 4B

ORIGINAL:

| | FRAME 1 | FRAME 2 | FRAME 3 | FRAME 4 | FRAME 5 | FRAME 6 | FRAME 7 | FRAME 8 | FRAME 9 |
|---|---|---|---|---|---|---|---|---|---|
| DISPLAY TIME | x | x+1/30 | x+2/30 | x+3/30 | x+4/30 | x+5/30 | x+6/30 | x+7/30 | x+8/30 |
| DURATION | 1/30 | 1/30 | 1/30 | 1/30 | 1/30 | 1/30 | 1/30 | 1/30 | 1/30 |

FIG. 4C

DROPPED FRAME:

| | FRAME 1 | FRAME 2 | FRAME 3 | FRAME 4 | FRAME 5 | FRAME 6 | FRAME 7 | FRAME 8 | FRAME 9 |
|---|---|---|---|---|---|---|---|---|---|
| DISPLAY TIME | x | x+1/30 | x+2/30 | x+3/30+ 1/180 | x+4/30+ 2/180 | DROPPED | x+5/30 +3/180 | x+6/30 +4/180 | x+7/30 +5/180 |
| DURATION | 1/30 | 1/30 | 1/30+ 1/180 | 1/30+ 1/180 | 1/30+ 1/180 | | 1/30+ 1/180 | 1/30+ 1/180 | 1/30+ 1/180 |

METHOD FOR REDUCING DIGITAL VIDEO FRAME FREQUENCY WHILE MAINTAINING TEMPORAL SMOOTHNESS

BACKGROUND OF THE INVENTION

(1) Field of the Invention

The field of the invention is digital video representation, more specifically, the present invention is related to a method and apparatus for reducing digital video frame frequency while maintaining temporal smoothness.

(2) Related Art

Video media consists of a series of still pictures or frames which are displayed in order and at a steady speed. A video decoder decompresses the pictures in a timely manner allowing each picture to be available for display at the correct time. If the decompression cannot be completed by that time, it becomes necessary to either degrade the quality of the picture so the decompression may be performed quickly or to skip that particular frame. Generally, when frames are dropped, the previously displayed frame remains visible on the display medium twice as long resulting in a visible pause in the video.

FIG. 1 is a process flow diagram illustrating an exemplary processing of an encoded video stream. Encoded video stream 101 is parsed in block 102. The parsed encoded video stream is then decoded in block 103 and reconstructed in block 104. If video processing is delayed, then one or more video frames are dropped in block 105. Otherwise, the reconstructed video picture is rendered for display in block 105.

When a frame is dropped to compensate for delay in the processing of a video stream as was described above, the human eye is able to detect the loss of that picture, particularly in areas with a high frequency of motion. With the migration from hardware decoders to software decoders, video such as movies which are difficult to decode may cause a software decoder to fall behind and consequently drop one or more video frames.

In order to reduce the possibility that the human eye will detect a stall when a frame is dropped, a method and an apparatus for reducing digital video frame frequency while maintaining temporal smoothness of the video sequence being displayed are desirable.

BRIEF SUMMARY OF THE INVENTION

A method for reducing digital video frame frequency while maintaining temporal smoothness during processing of video frames for display is disclosed. The method predicts the number of video frames to be dropped prior to decoding of a video frame in response to a delay in the processing of video frames, adjusts the timestamp for each video frame surrounding the video frames to be dropped in response to the predicting and displays the video frames surrounding the video frames to be dropped according to the adjusted timestamp.

BRIEF DESCRIPTION OF THE DRAWINGS

FIG. 2a illustrates an exemplary processing of video information from video capture to display.

FIG. 4b is a table illustrating frames one through nine in an original sequence before a frame is dropped.

FIG. 4c is the table with the same frames one through nine but with a dropped frame six.

DETAILED DESCRIPTION OF THE INVENTION

Figure 1:
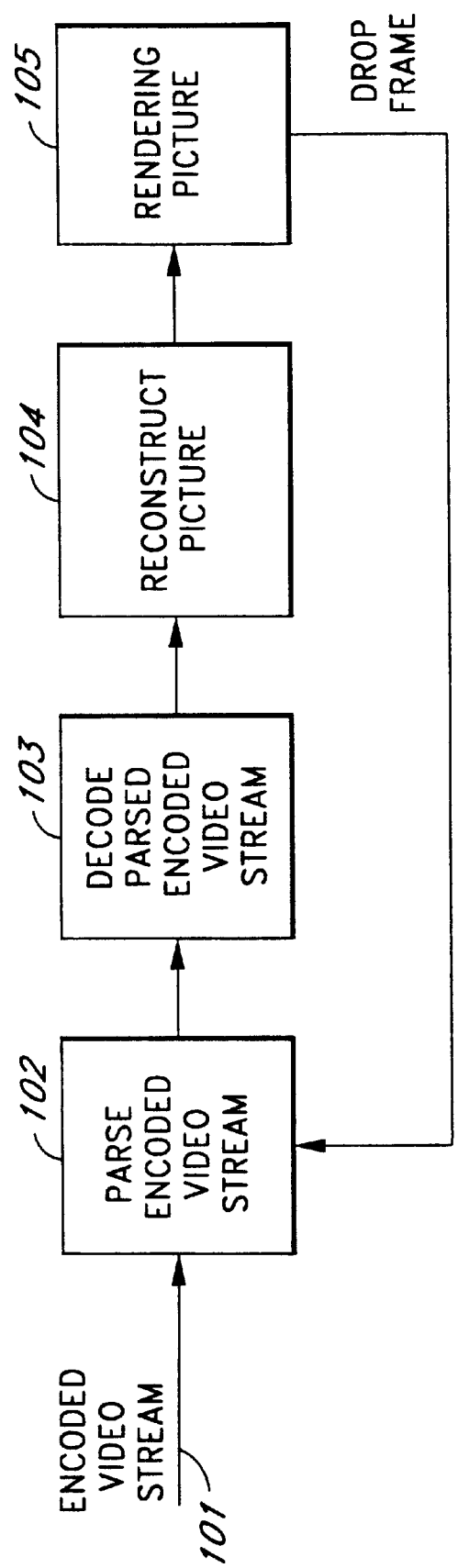
FIG. 1 is a process flow diagram illustrating the prior art processing of an encoded video stream.

The present invention is a method and apparatus for reducing digital video frame frequency while maintaining temporal smoothness of a digital video sequence being displayed.

In order to reduce the possibility that the human eye will detect a stall when a frame is dropped, the present invention adjusts the timestamp associated with a predetermined number of frames surrounding the dropped frame. Each of the predetermined number of frames surrounding the dropped frame is displayed for the same amount of time. The present invention also predicts when it will be necessary to drop a frame such that the timestamps for the remaining frames can be adjusted before they are displayed. By predictively dropping frames and adjusting the timestamps of a predetermined number of frames surrounding the dropped frame, the present invention allows today's central processing units (CPU's) to implement a full software video decoder.

FIG. 2a illustrates an exemplary system for processing video information from video capture to video display with an exemplary implementation of the present invention. A video capture medium 200 such as a video camera is coupled to a compressor medium 201. Video capture medium 200 captures video information and transmits the video information to an encoder and compressor medium 201. Once the video information is encoded and compressed, it is transmitted to a software decoder 202 and a decompressor medium (not shown) on computer 209 through transmission medium 204 such as a satellite, cable, compact disk (CD), read only memory (ROM), digital video/versatile disk (DVD)-ROM or the Internet.

Software decoder 202 with an implementation of the present invention resides in a storage medium 205 coupled to a central processing unit (CPU) 206 by a bus 203 on computer 209. Storage medium 205 has an internal system clock 211 coupled to software decoder 202. Software decoder 202 has a delay predictor 207 and a timestamp adjuster 208. Delay predictor 207 coupled to timestamp adjuster 208 predicts the number of frames which need to be dropped if software decoder 202 detects a delay during video processing. Timestamp adjuster 208 calculates new timestamps for each frame surrounding the dropped frame.

Once the video information is decoded by software decoder 202, it is reconstructed for display by rendering system 210 coupled to decoder 202 and transmitted for display to a display device 209 such as a television (TV) or a personal computer monitor.

Figure 2B:
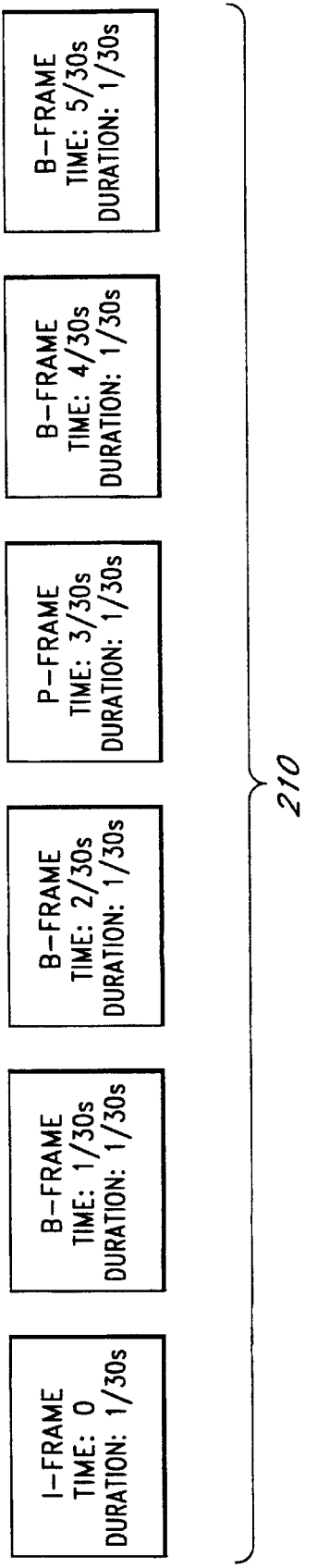
FIG. 2b illustrates an exemplary video frame sequence represented with MPEG-2 video standard I, P and B frames.

FIG. 2b illustrates an exemplary video frame sequence 210 which frequency may be altered by the present invention to avoid visible stalls of the video frames during video presentation. The present invention may be utilized for video data stored in various media. The particular exemplary video frame sequence 210 is representative of one made available through a digital video/versatile disk (DVD). The DVD is the next generation of optical disc storage technology. DVD's can hold video, audio and computer data and may be utilized in various media requiring display of data including video, audio and computer data. The video format for a DVD conforms to the International Organization of Standardization (ISO) Moving Pictures Experts Group 2 (MPEG-2) video standard (13818-2) dated November, 1994.

In the MPEG-2 video standard, there are three types of frames, namely I, P and B-frames. The I and P frames are referred to as reference frames. More specifically, the I and P frames are used during the decoding of P and B frames as references. For example, the data stream for a B frame may only contain the difference between the pixel data output and the previous or future I and P frame pixel data.

A DVD requires that there are always two B frames between reference frames. If one of the two B frames is dropped, the number of frames available within a second is reduced. In contrast to I and P frames, B frames are not used as a reference by any other frame. B frames are therefore the first candidate to drop when a central processing unit (CPU) is unable to maintain the full frame rate while processing video data. Further, B frames are the ideal type of frame to degrade or drop since errors will not be propagated by altering the B frames in any form.

Figure 3:
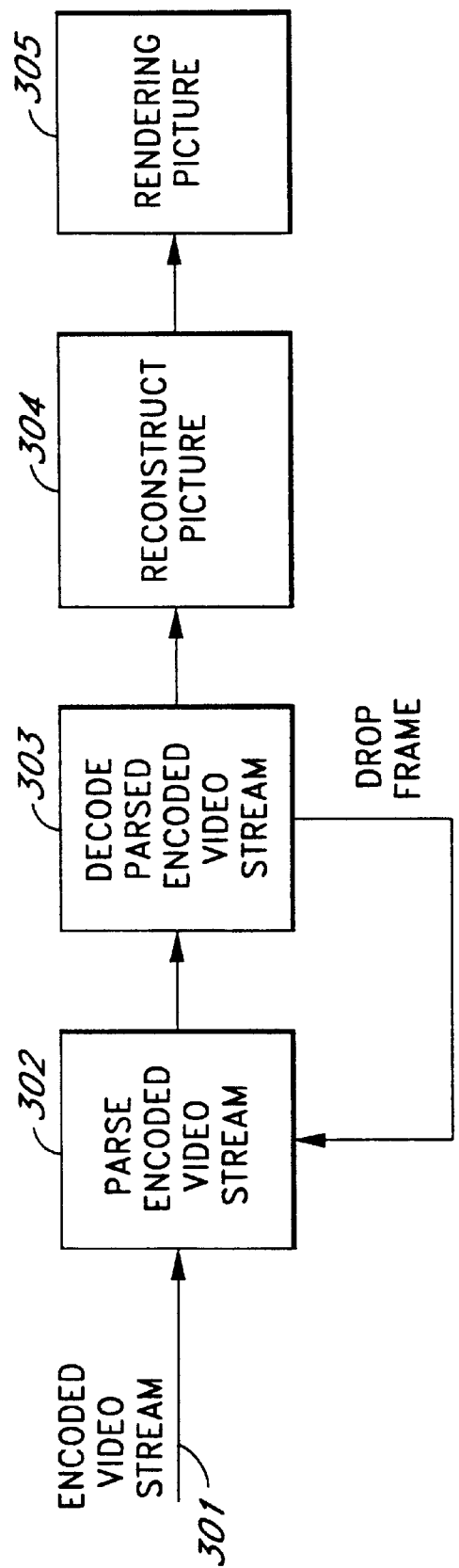
FIG. 3 is a process flow diagram illustrating an exemplary processing of an encoded video stream by the present invention.

FIG. 3 is a process flow diagram illustrating an exemplary processing of an encoded video stream and an implementation of the present invention's method of dropping video frames upon a video processing delay. An encoded video stream 301 is parsed in block 302. The parsed encoded video stream 301 is then processed by software decoder 202 in block 303. With the present invention, if the software decoder has fallen behind video processing, software decoder 202 proactively drops a frame and resets the timestamp of the frames surrounding the dropped frame. Otherwise, software decoder 202 decodes the parsed encoded video stream 301. The video picture is then reconstructed in block 304 and rendered for display in block 305.

Figure 4A:
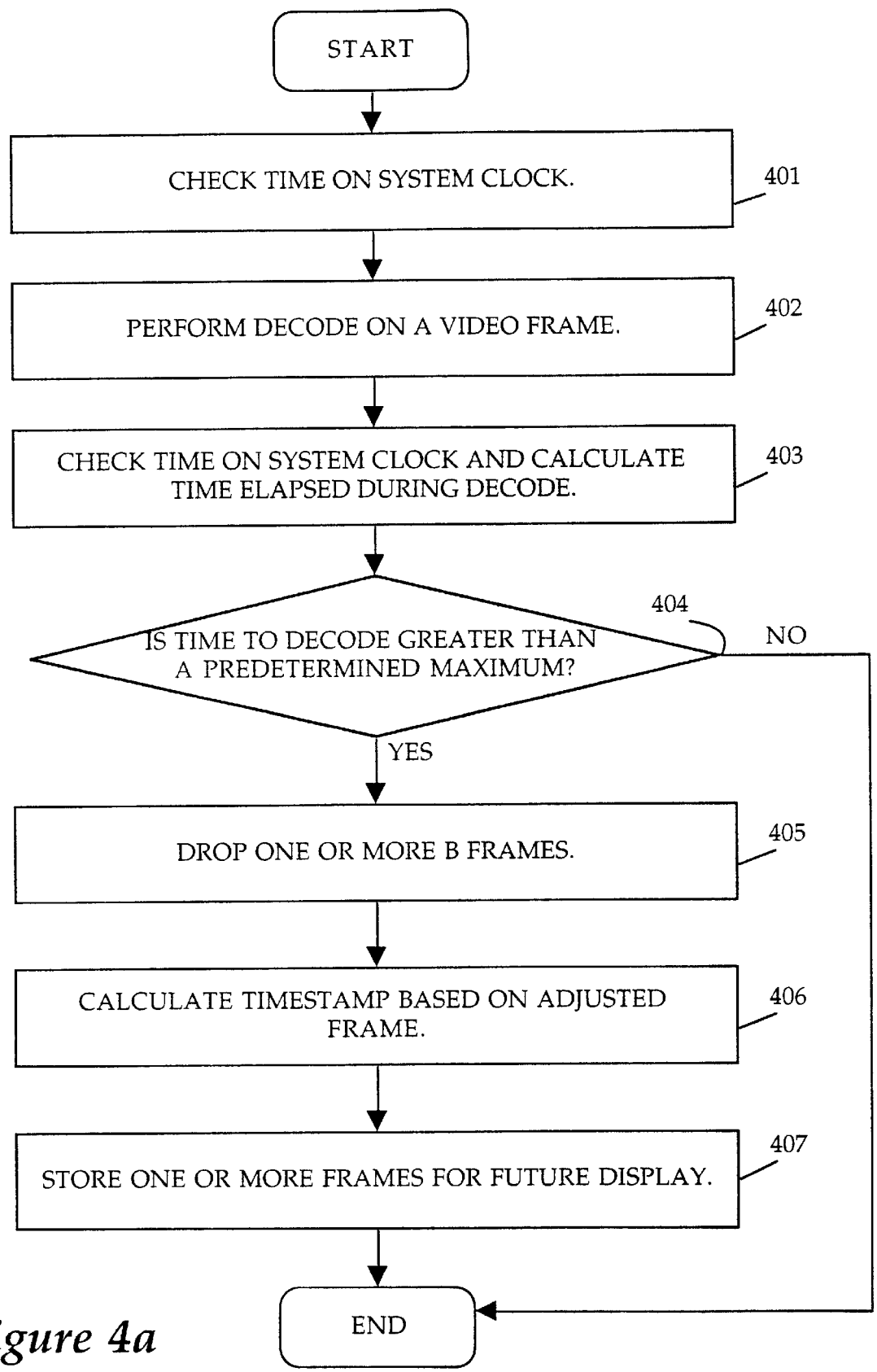
FIG. 4a is a flow diagram illustrating the general steps followed by the present invention in processing a video stream.

FIG. 4a is a flow diagram illustrating an exemplary processing of a video stream by a software decoder with an implementation of the present invention. In step 401, the time on the system clock is checked by the software decoder, and in step 402, MPEG-2 decoding is performed on an encoded video bit stream. In step 403, the system clock time is again checked by the software decoder to determine the time elapsed (also referred herein as the tick count) during the decode step in step 402.

In step 404, a delay predictor of the software decoder determines whether the time to decode the previous video frame (average decode time) is greater than a predetermined maximum time and hence whether a delay is detected. If the rendering system detects delay, then the rendering system sends the time difference between the current time and the time at which the current frame should be processing to the delay predictor of the software decoder. The delay predictor adds the time difference to the average decode time.

The predetermined maximum time is the reciprocal of the encoded frame rate. The encoded frame rate is the number of frames encoded per second in a video bit stream. For example, in a DVD movie, twenty-four frames per second are typically encoded in a video bit stream. The predetermined maximum time in this case is therefore 1/24 (reciprocal of the encoded frame rate) of a second per video frame. If the average of the previous decode times of the DVD movie being processed is greater than the predetermined maximum time of 1/24 of a second, then a delay is detected and frames must be dropped.

In step 405, if the time to decode the previous video frame is greater than a predetermined maximum time, then it is determined that there is a delay in the current video processing and the delay predictor determines the number of B frames to drop.

In step 406, a timestamp adjuster adjusts the timestamp for the frames surrounding the dropped frame. For example, given a dropped frame occurring at 5/30 of a second from a given start time X and the dropped frame has a duration of 1/30 of a second, the timestamps of a predetermined number of frames, for example three frames prior to and three frames after the dropped frame, are adjusted. More specifically, in order to evenly distribute the remaining six frames (three frames before and three frames after the dropped frame) to compensate for the missing frame, each of the six frames must take 1/6 of the duration of the dropped frame or 1/180 of a second (the duration of the dropped frame 1/30 divided by a predetermined number of frames surrounding the dropped frame which in this case is 6). This example is illustrated in FIGS. 4b and 4c. In step 407, the frames surrounding the dropped frames are then stored in the storage medium for future display by a display medium.

FIG. 4b is a table illustrating frames one through nine in an original sequence prior to a frame in the sequence being dropped along with the timestamp for each frame. A timestamp 415 for each video frame has a display time 410 and a duration 420. Display time 410 shows what time the frame is to be displayed and duration 420 lists the duration of the frame. Display time 410 and duration 420 may be stored in a reference table or a header for each video frame.

FIG. 4c illustrates the table with the same frames one through nine but with a dropped frame six. In this case, the timestamp of the three frames prior to the dropped frame, namely frames three through five and the three frames following the dropped frame, namely frames seven through nine, are adjusted. More specifically, the duration of the dropped frame which is 1/30 must be evenly distributed to the six frames to compensate for the dropped frame. Thus, 1/6 of 1/30 of a second is added to the duration of each of the six frames to compensate for the dropped frame. The display time of frames three, four, five, seven, eight and nine are adjusted to reflect the new starting time of the respective frames.

Figure 5:
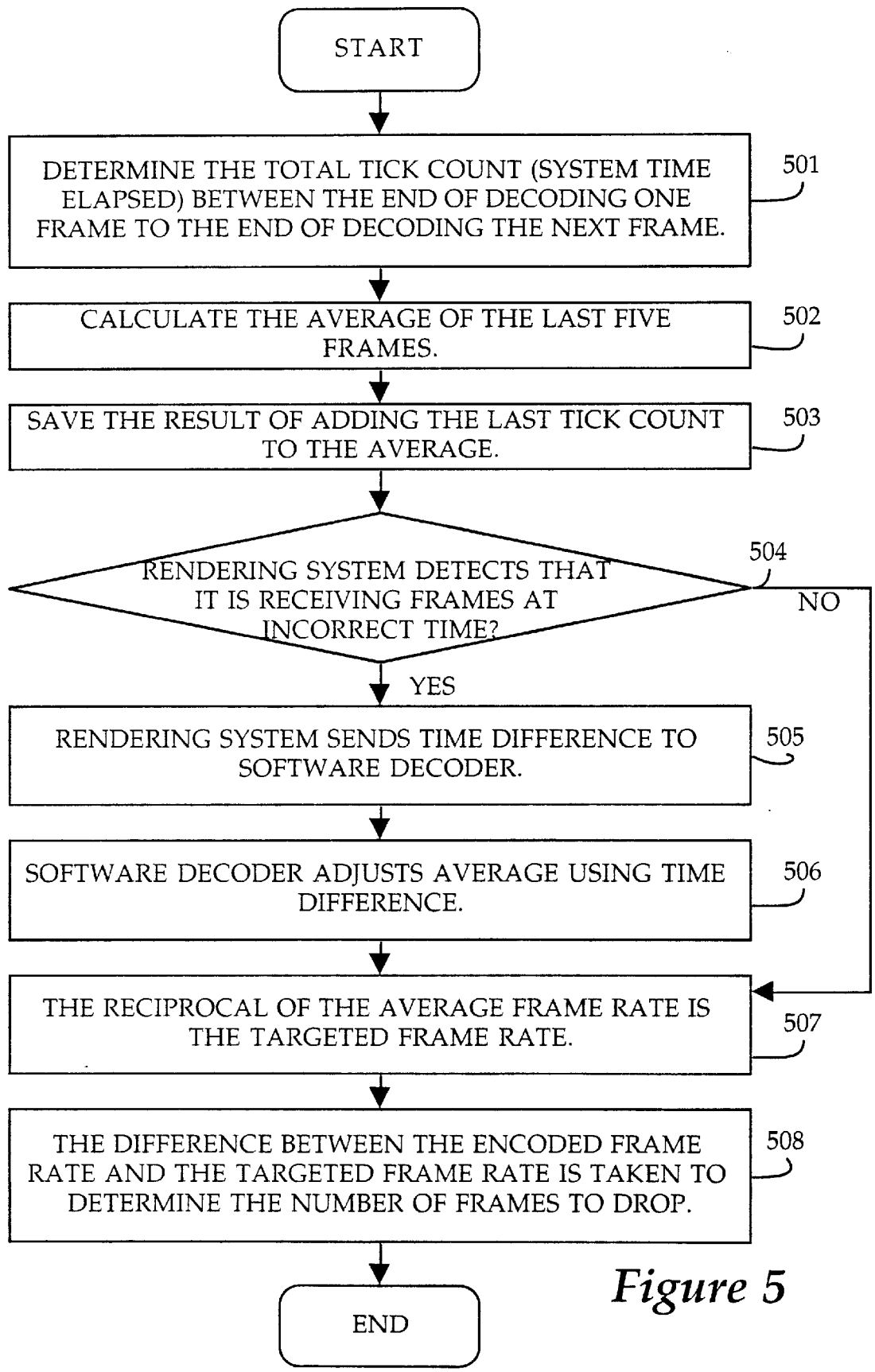
FIG. 5 is a flow diagram illustrating the general steps followed by the present invention in predicting the need to drop video frames and in determining the number of frames to drop per second.

FIG. 5 illustrates an exemplary method and apparatus by which the present invention determines the number of frames to drop per second. In step 501, the delay predictor of the software decoder of the present invention determines the total tick count (system time elapsed) between the end of decoding one frame to the end of decoding the next frame to generate a frame's decode time. In step 502, the average decode time of a predetermined number of frames decoded such as the last five frames decoded are determined and saved in a storage medium. In step 503, the total decode time (system time elapsed) during decoding of a frame is added and to the existing average decode time averaged to generate a new average decode time.

In step 504, if the rendering system detects that it is receiving frames at an incorrect time, then in step 505 the rendering system sends the time difference between the current time and the correct time at which the current frame should be processing to the delay predictor of the software decoder. The current time is taken from the internal system clock (211) and the correct time is taken from the display time (410) of the timestamp of each video frame.

In step 506, the delay predictor detects a delay through the method described in step 404 of the text accompanying FIG. 4 and also detects a delay once the time difference from the rendering system is received. The delay predictor then adds the time difference to the average decode time and to generate an adjusted average decode time.

In step 507, the delay predictor determines the targeted frame rate by taking the reciprocal of the average decode time. In step 508, the delay predictor then takes the difference between the encoded frame rate and the targeted frame rate to determine the number of frames to drop.

For example, if the encoded frame rate is twenty-four frames per second, then each frame must have a decode time of no more than 1/24 of a second when measured from the end of decoding the previous frame to the end of decoding the current frame (step 501). If the average decode time of the last five frames exceeds 1/24 of a second, then the number of frames to drop would equal twenty-four frames per second (encoded frame rate) minus the reciprocal of the average decode time (targeted frame rate).

Figure 6:
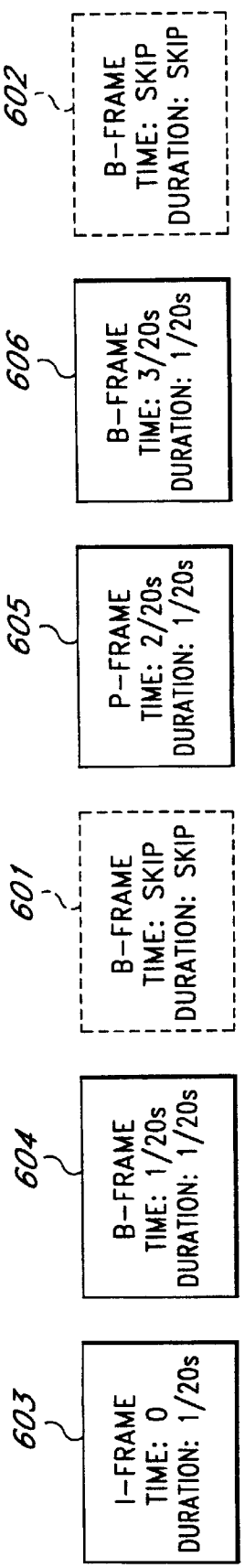
FIG. 6 illustrates an exemplary video sequence of FIG. 2b as modified by the method and apparatus of the present invention to compensate for delay detected by a software decoder decoding a video stream.

FIG. 6 illustrates an exemplary video sequence of FIG. 2b as modified by the method and apparatus of the present invention to compensate for delay detected by the software decoder and/or the rendering system. B frames 601 and 602 are dropped to compensate a delay in video processing. The timestamps of the surrounding frames 603 through 606 are adjusted to be displayed without producing any visible stall in the video sequence.

What has been described is a method and an apparatus for maintaining the visual temporal smoothness of a digital video sequence being displayed by predictively dropping video frames in the digital video sequence and adjusting the timestamps of a predetermined number of the video frames surrounding the dropped video frames.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for maintaining temporal smoothness during processing of video frames comprising the steps of:
    predicting the number of video frames to be dropped prior to decoding of a video frame in response to a delay in the processing of the video frames;
    adjusting the timestamp of each video frame surrounding said video frames to be dropped in response to said step of predicting; and
    displaying video frames surrounding said video frames to be dropped according to said adjusted timestamp.

2. The method of claim 1 wherein said step of adjusting further comprises the step of dividing the timestamp of said video frames to be dropped by a predetermined number of frames surrounding said video frames to be dropped to generate an adjustment value to be added to the timestamp of each said predetermined number of frames surrounding said video frame to be dropped.

3. The method of claim 1 wherein said step of predicting further comprises the step of determining an average decode time from the average time elapsed during decoding of a predetermined number of previous video frames.

4. The method of claim 3 further comprising the step of generating an updated average decode time by adding the time elapsed of the last most recent video frame decoded.

5. The method of claim 4 further comprising the step of generating a targeted frame rate from the reciprocal of said average decode time, said targeted frame rate being the frame rate to be achieved during video processing.

6. The method of claim 5 further comprising the step of determining a time difference between a current time and a correct time at which a current video frame should be processing, said time difference being added to said average decode time and averaged to generate a new average decode time.

7. The method of claim 1 further comprising the step of detecting said delay in the processing of the video data.

8. The method of claim 7 further comprising the step of determining an average decode time from the average time elapsed during decoding of a predetermined number of previous video frames.

9. The method of claim 8 further comprising the step of determining whether said average decode time is greater than a predetermined maximum time.

10. The method of claim 9 wherein said predetermined maximum time is an average of previous decode times.

11. The method of claim 10 wherein said predetermined maximum time is the reciprocal of an encoded frame rate, said encoded frame rate being the number of frames per second found in the video data being processed.

12. The method of claim 11 further comprising the step of determining the number of frames to drop by taking the difference between said encoded frame rate and said targeted frame rate, said encoded frame rate being the number of frames found in the video data being processed per second.

13. An apparatus comprising:
    a decoder which decodes video information having,
        a delay predictor which predicts the number of frames to be dropped,
        a timestamp adjuster coupled to said delay predictor, said timestamp adjuster which determines a new timestamp for each video frame surrounding said video frames to be dropped; and
    a video image renderer coupled to said decoder, said video image renderer displays said video frames surrounding said video frames to be dropped according to said new timestamps.

14. The apparatus of claim 13 wherein said delay predictor determines an average decode time from the average time elapsed during decoding of a predetermined number of previous video frames, generates a targeted frame rate from the reciprocal of said average decode time, said targeted frame rate being the frame rate to be achieved during video processing, and determining the number of frames to drop by taking the difference between said encoded frame rate and said targeted frame rate, said encoded frame rate being the number of frames found in the video data being processed per second.

15. The apparatus of claim 13 wherein said timestamp adjuster divides the timestamp of said frames to be dropped by the number of a predetermined number of video frames surrounding said video frames to be dropped to generate an adjusted timestamp for each said predetermined number of video frames surrounding said video frames to be dropped.

16. An apparatus comprising:
    means for decoding video information having,
        means for predicting the number of video frames to be dropped,
        means for adjusting coupled to said means for predicting, said means for adjusting adjusts new timestamp for each video frame surrounding said video frames to be dropped; and means for rendering coupled to said means for decoding, said means for rendering renders video frames for display, displaying video frames surrounding said video frames to be dropped according to said new timestamps.

17. The apparatus of claim 16 wherein said means for predicting determines an average decode time from the average time elapsed during decoding of a predetermined number of previous video frames, generates a targeted frame rate from the reciprocal of said average decode time, said targeted frame rate being the frame rate to be achieved during video processing, and determining the number of frames to drop by taking the difference between said encoded frame rate and said targeted frame rate, said encoded frame rate being the number of frames found in the video data being processed per second.

18. The apparatus of claim 16 wherein said means for adjusting divides the timestamp of said frames to be dropped by the number of a predetermined number of video frames surrounding said video frames to be dropped to generated an adjusted timestamp for each said predetermined number of video frames surrounding said video frames to be dropped.

19. A video decoding system comprising:

a storage medium having, a decoder which decodes video frames, said decoder having, a delay predictor which predicts the number of video frames to be dropped, and a timestamp adjuster coupled to said delay predictor, said timestamp adjuster calculates a new timestamp for each video frame surrounding said video frames to be dropped, and a video image renderer coupled to said decoder, said video image renderer displays video frames surrounding said video frames to be dropped according to said new timestamp; and a central processing unit coupled to said storage medium, said central processing unit processes said delay predictor, said timestamp adjuster and said video image renderer.

20. The system of claim 19 wherein said delay predictor determines an average decode time from the average time elapsed during decoding of a predetermined number of previous video frames, generates a targeted frame rate from the reciprocal of said average decode time, said targeted frame rate being the frame rate to be achieved during video processing, and determining the number of frames to drop by taking the difference between said encoded frame rate and said targeted frame rate, said encoded frame rate being the number of frames found in the video data being processed per second.

21. The system of claim 19 wherein said timestamp adjuster divides the timestamp of said frames to be dropped by the number of a predetermined number of video frames surrounding said video frames to be dropped to generated an adjusted timestamp for each said predetermined number of video frames surrounding said video frames to be dropped.

22. A video decoding system comprising:

a storage medium having, means for decoding video frames, said means for decoding having, means for predicting the number of video frames to be dropped, means for adjusting coupled to said means for predicting, said means for adjusting adjusts a new timestamp for each frame surrounding said frames to be dropped, and means for rendering coupled to said means for decoding, aid means for rendering renders video frames for display, displaying video frames surrounding said video frames to be dropped according to said new timestamp; and means for processing coupled to said storage medium, said means for processing said means for predicting, said means for adjusting and said means for rendering.

23. The system of claim 22 wherein said means for predicting the number of video frames to drop determines an average decode time from the average time elapsed during decoding of a predetermined number of previous video frames, generates a targeted frame rate from the reciprocal of said average decode time, said targeted frame rate being the frame rate to be achieved during video processing, and determining the number of frames to drop by taking the difference between said encoded frame rate and said targeted frame rate, said encoded frame rate being the number of frames found in the video data being processed per second.

24. The system of claim 22 wherein said means for adjusting divides the timestamp of said frames to be dropped by the number of a predetermined number of video frames surrounding said video frames to be dropped to generated an adjusted timestamp for each said predetermined number of video frames surrounding said video frames to be dropped.

* * * * *